Nov. 15, 1927.

C. H. TURNER 1,649,758

FRACTIONAL SETWORKS

Filed Sept. 22, 1926

6 Sheets-Sheet 3

WITNESSES
Guy M Spring
George V. Wright

Inventor
CHARLES H. TURNER

By Richard B. Owen
Attorney

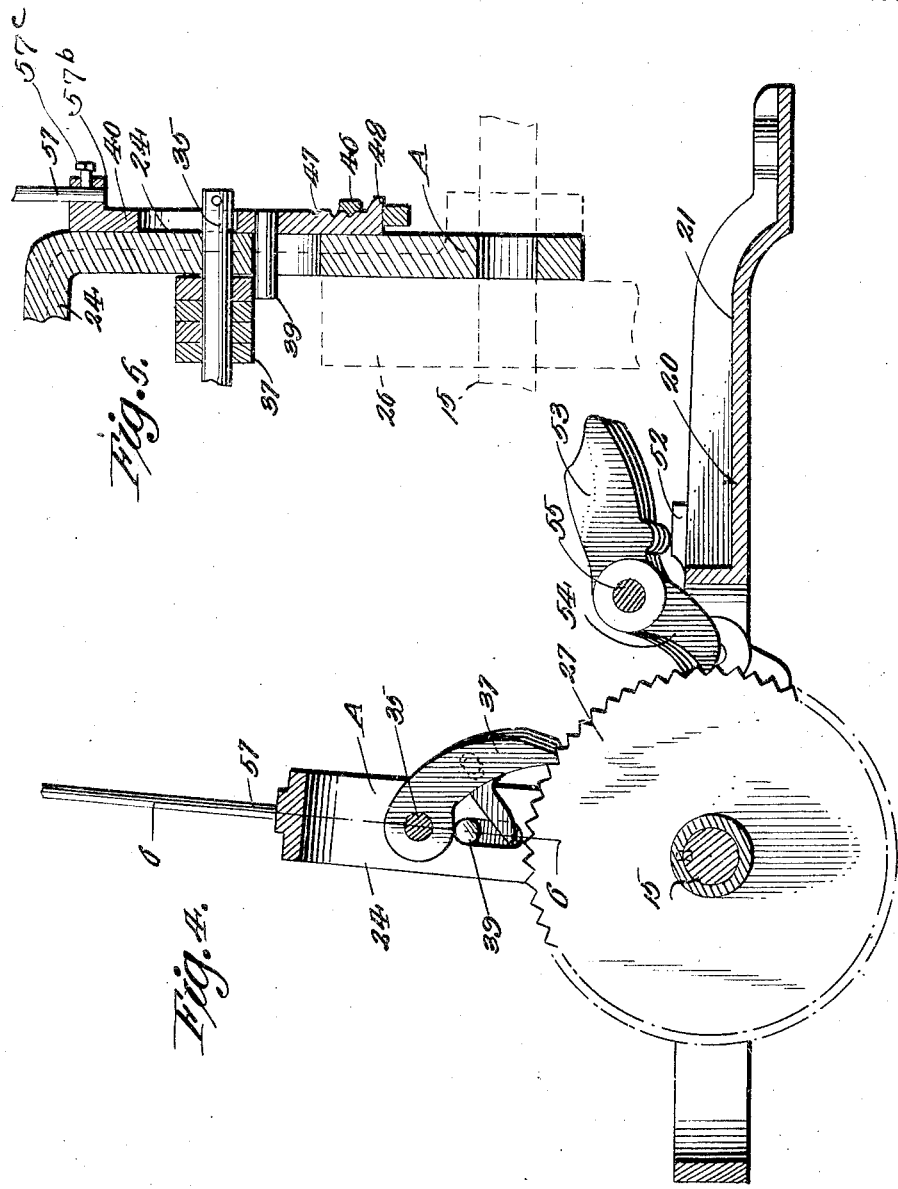

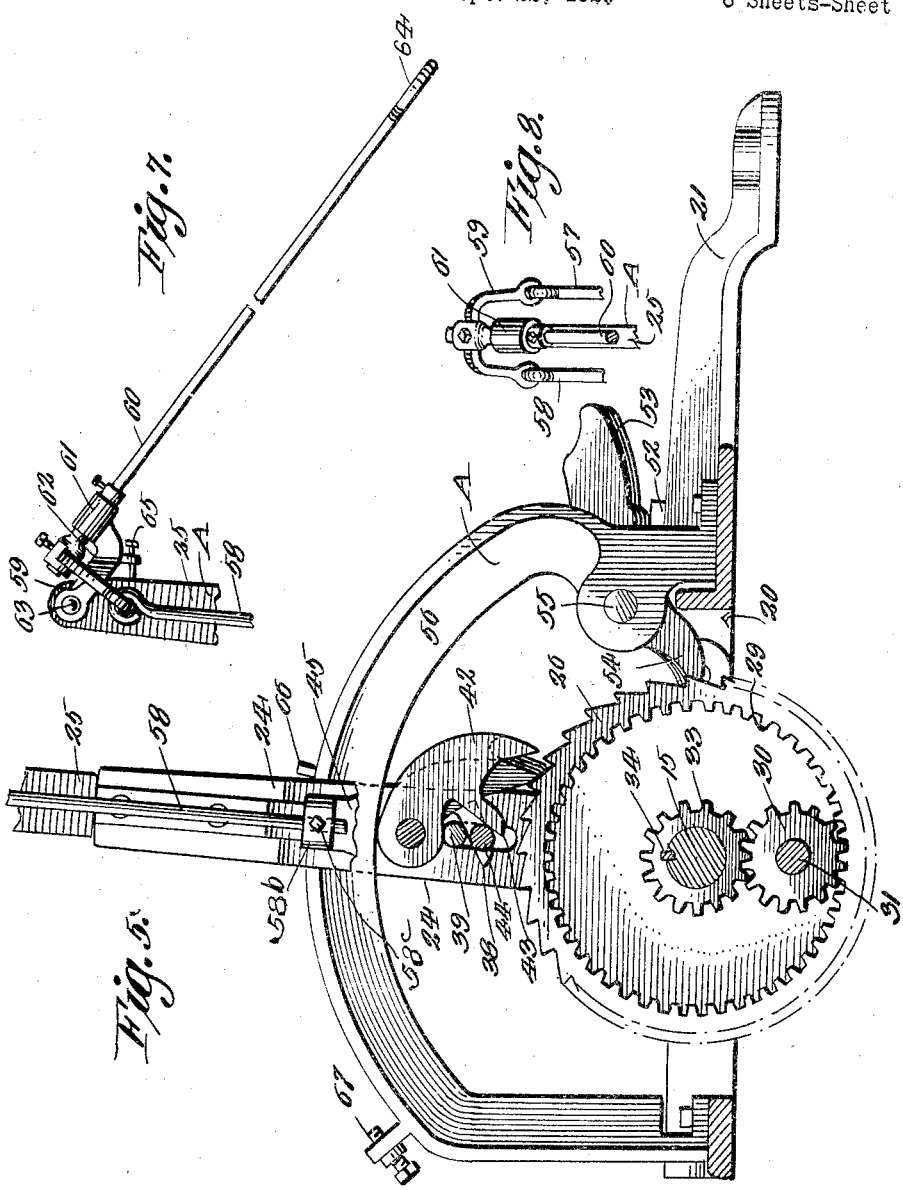

Nov. 15, 1927.
C. H. TURNER
1,649,758
FRACTIONAL SETWORKS
Filed Sept. 22, 1926   6 Sheets-Sheet 6
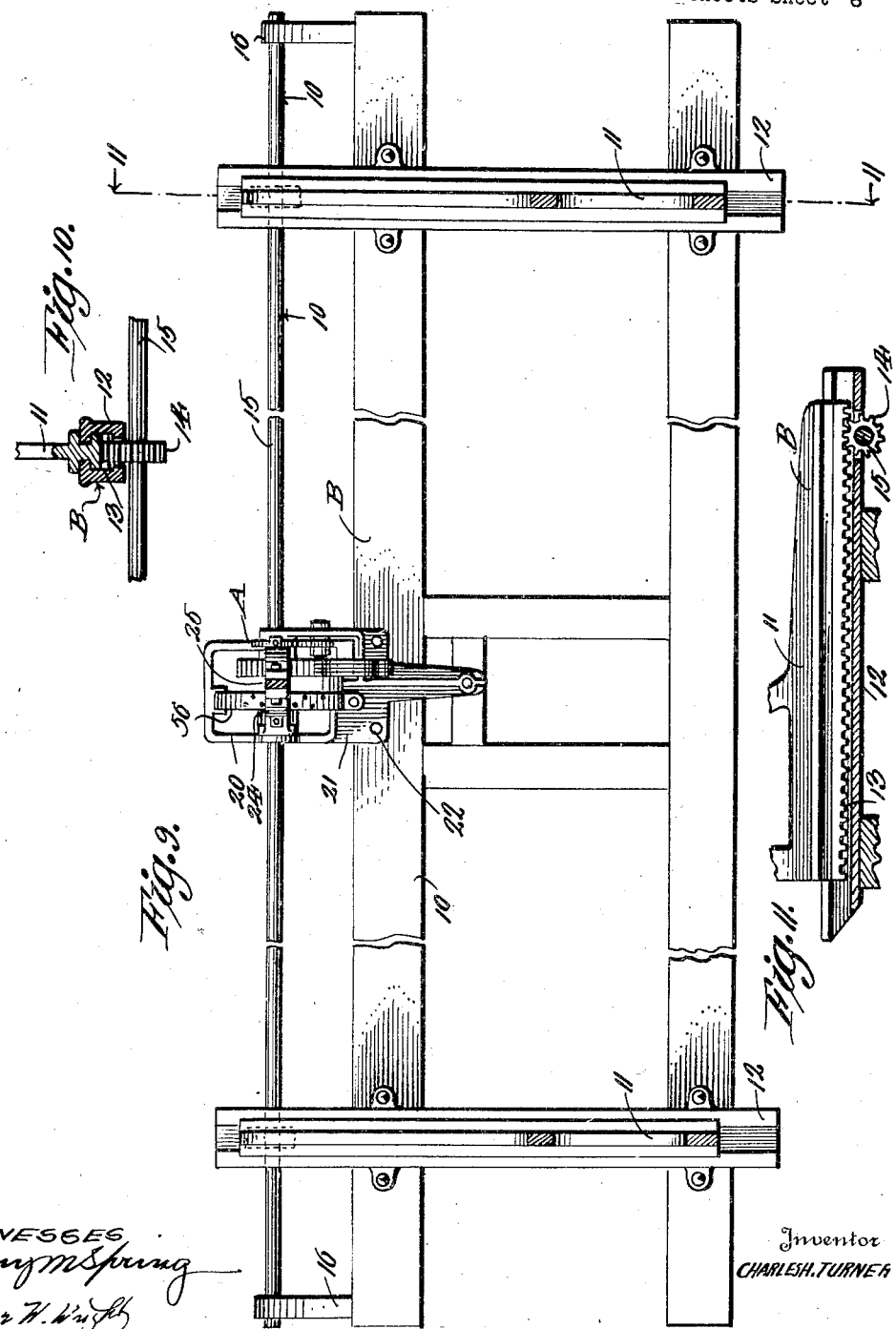

Patented Nov. 15, 1927.

1,649,758

UNITED STATES PATENT OFFICE.

CHARLES H. TURNER, OF STATESVILLE, NORTH CAROLINA.

FRACTIONAL SETWORKS.

Application filed September 22, 1926. Serial No. 137,121.

This invention relates to wood sawing and more particularly to a novel control and feed therefor.

One of the primary objects of this invention is to provide a novel feeder and receder having a single control which can be effectively used in connection with saw mills for advancing or receding the head blocks thereof and on tree felling machines for advancing the saw toward the work and moving the saw quickly away from the work.

Another prime object of the invention is the provision of a fractional set works for saw mills, the device including a novel control for permitting the advancement of the head blocks step by step toward the saw by sixteenths of an inch and which will hold the work in that position against movement while being operated upon, the device allowing the quick receding of the head blocks from the saw when desired.

A further object of the invention is the provision of an improved set works and receder embodying a single control lever or handle so arranged as to allow the work to be fed forward in a step by step movement toward the saw when turned to one position and to allow the quick receding of the work when turned to another position.

A further object of the invention is the provision of a combination fractional set works and receder for saw mills embodying an operating lever having means for disengaging the set pawls and for placing the receding pawls in operation synchronously or for throwing out the receding pawls and setting the set pawls in operation, whereby the device can be operated by one hand of the operator at all times.

A further object of the invention is the provision of novel means for holding the operating lever in adjusted position after actuation of the pawls so as to prevent accidental movement thereof.

A still further object of the invention is the provision of a novel lock for holding the set mechanism against movement after the head blocks have been advanced, the lock being automatically released when the set pawls are thrown out of operation.

Figure 1:
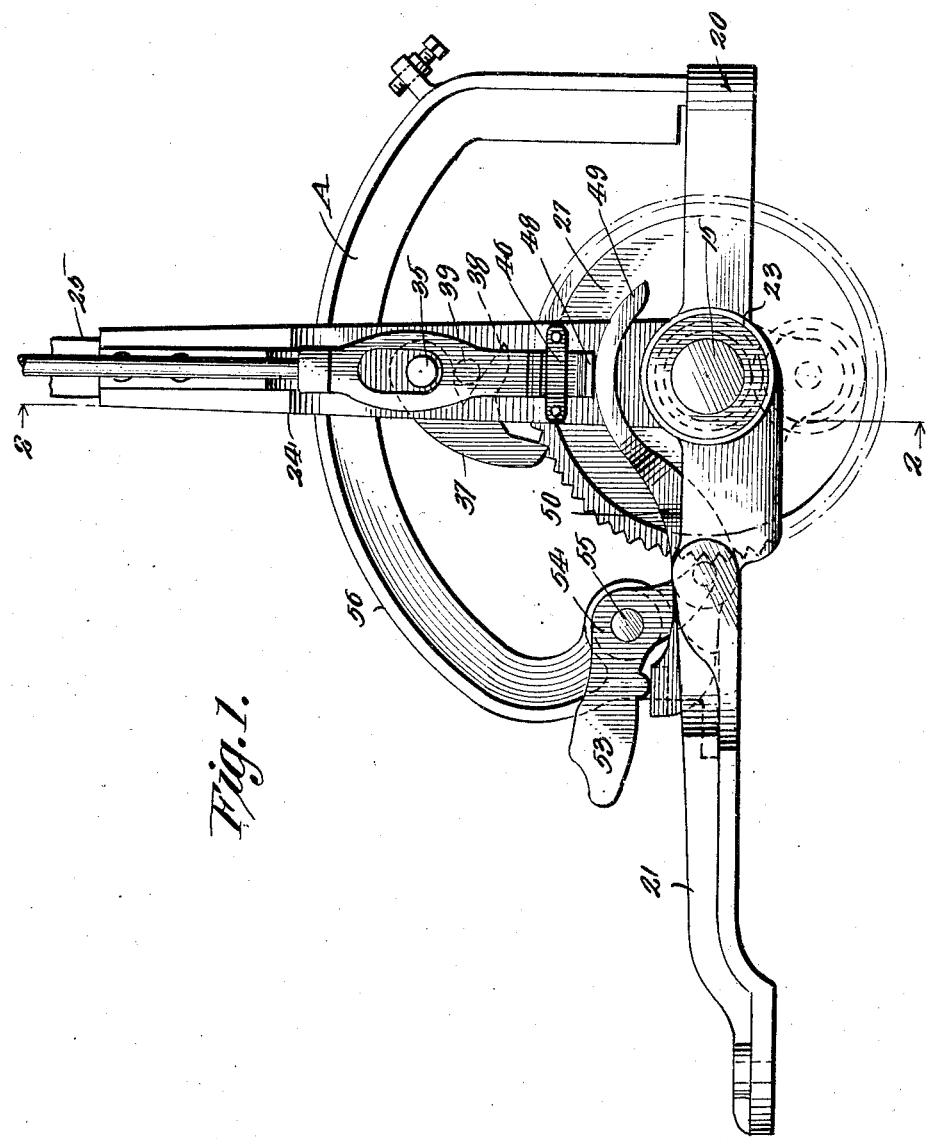
Figure 2:
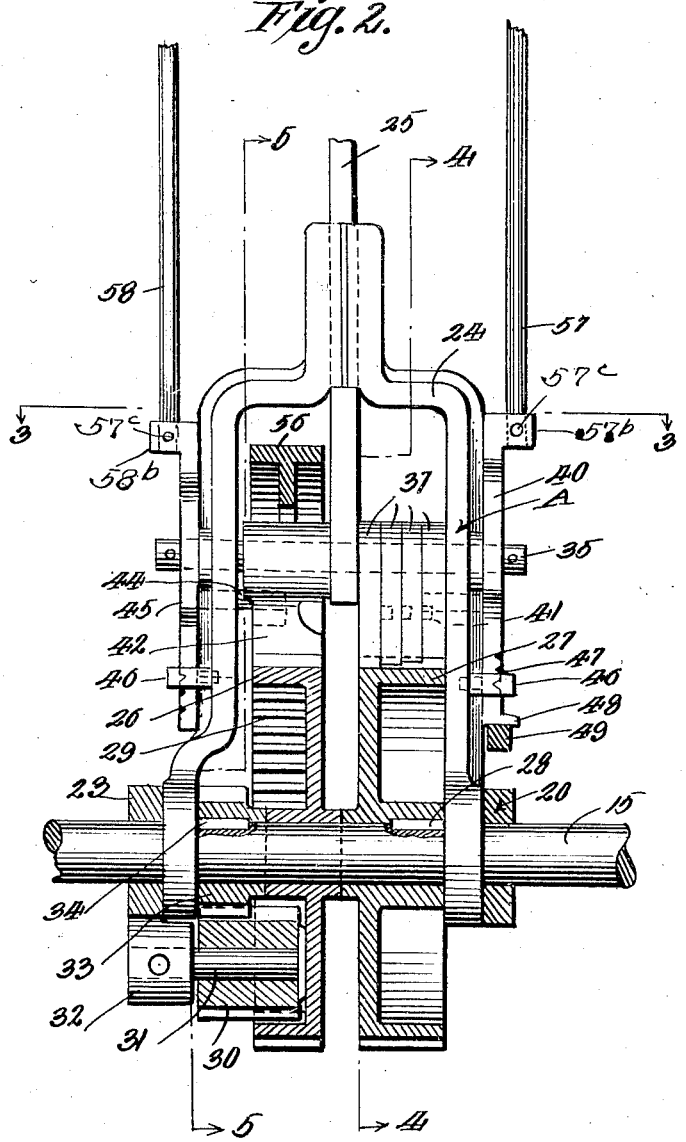
Figure 3:
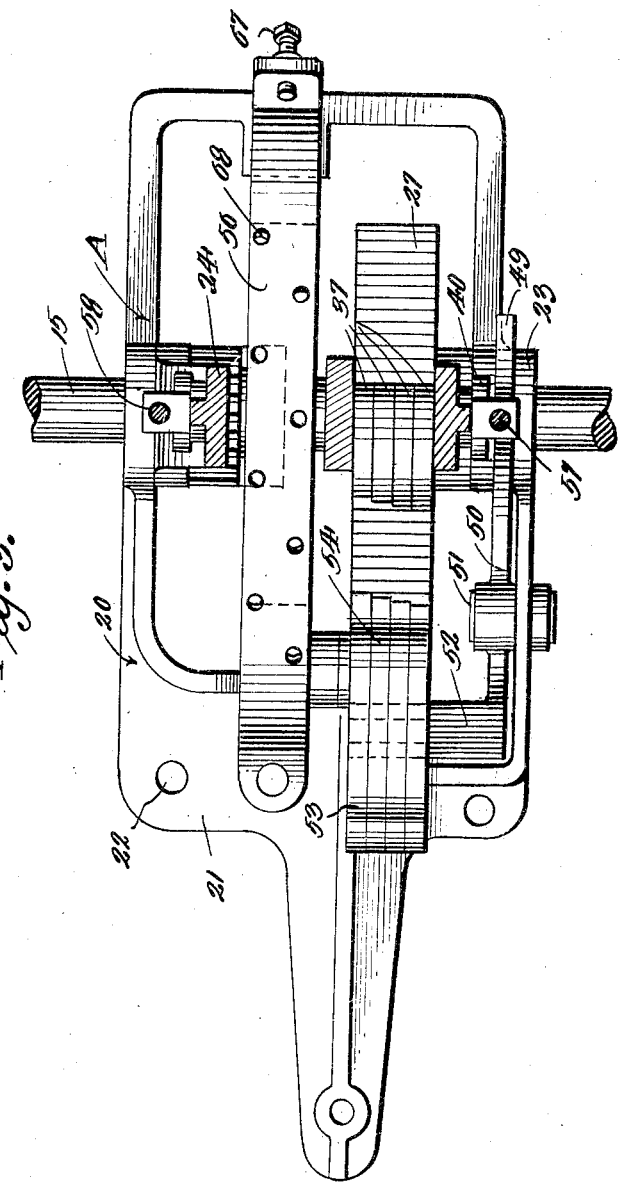

With these and other objects in view, the invention consists in the novel construction, arrangement and formation of parts as will be hereinafter more specifically described, claimed, and illustrated in the accompanying drawings, in which drawings:

Figure 1 is a side elevation of the improved device showing the same removed from a saw mill or like appliance, Figure 2 is a vertical section taken on the line 2—2 of Figure 1 looking in the direction of the arrows, Figure 3 is a horizontal section taken on the line 3—3 of Figure 2 looking in the direction of the arrows, Figure 4 is a vertical section taken on the line 4—4 of Figure 2 looking in the direction of the arrows showing the arrangement of the stepped pawls and the locking pawls, Figure 5 is a vertical section taken on the line 5—5 of Figure 2 looking in the direction of the arrows showing the arrangement of the receding pawl and the position thereof when the stepped pawls are in operation, Figure 6 is an enlarged detail section taken on the line 6—6 of Figure 4 illustrating the means employed for actuating the stepped pawls and the friction lock for holding the actuating means against accidental movement, Figure 7 is a side elevation of the upper end of the operating lever showing the novel control handle incorporated therewith, Figure 8 is a front elevation of the upper end of the operating lever showing the novel control handle connected therewith, Figure 9 is a plan view of a saw mill carriage, illustrating the application of my improved device thereto, Figure 10 is a detail section taken on the line 10—10 of Figure 9, and Figure 11 is a section taken on the line 11—11 of Figure 9 showing the connection between the head blocks and the control shaft.

Referring to the drawings in detail, wherein similar reference characters designate corresponding parts throughout the several views the letter A generally indicates the improved device and B a conventional saw mill.

In the drawings I have illustrated the device incorporated with a saw mill and used as a fractional set works and quick receder therefor, but it is to be understood that the device can be used for other purposes, such as on tree felling machines for advancing the saw toward the work and for moving the saw away from the work.

As stated, the saw mill B is of any preferred conventional character and includes the usual carriage 10 having the movable head blocks 11 for the work slidably mounted in suitable guides 12 mounted upon the carriage. The lower faces of the head blocks 11 are provided with racks 13 which have meshing therewith pinions 14. These pinions 14 are keyed or otherwise secured to a control shaft 15 which extends longitudinally of the carriage and is rotatably mounted thereon by the use of bearing brackets or the like 16.

The improved device A comprises a supporting frame 20 which can be of an open rectangular configuration. The inner end of this frame carries a suitable attaching and supporting plate 21 having openings 22 therein, whereby the frame can be bolted to one of the sills or timbers of the carriage 10. The frame 20, substantially at the transverse center thereof is provided with bearings 23 for receiving the shaft 15 which extends through the frame. This shaft 15 has rockably mounted thereon a yoke 24, the upper end of which has secured thereto or formed thereon the operating lever 25. As shown the yoke is provided with a socket for receiving the operating lever 25. In the present instance the arms of the yoke 24 are mounted within the sides of the frame 20. Disposed within the frame are a pair of fast and slow ratchet wheels 26 and 27. The ratchet wheel 27 is keyed as at 28 to the shaft 15, while the ratchet wheel 26 is rotatably mounted thereon. The teeth of the ratchet wheel 27 are equidistantly and accurately spaced, such as one sixteenth of an inch apart. This allows the work to be advanced by sixteenths as will be hereinafter described.

The ratchet wheel 26 is provided with an internal gear 29 which has meshing therewith a pinion 30. This pinion 30 is rotatably mounted on a stub shaft 31 carried by a suitable support 32 formed on the frame 20. The pinion 30 in turn meshes with a pinion 33 keyed as at 34 to the shaft 15. It thus can be seen that when the ratchet wheel 27 is actuated the shaft 15 will be rotated in one direction and that when the ratchet wheel 26 is turned in the same direction as the ratchet wheel 27 the shaft 15 will be rotated in a reverse direction and at a relatively high rate of speed due to the gears and pinion 29, 30 and 33.

The yoke 24 above the ratchet wheels 26 and 27 supports a cross shaft or rod 35. The lever 25 has its lower end notched for receiving the cross shaft and the lever forms means for holding the sets of pawls 37 provided for the ratchet wheel 27 against transverse movement on the shaft 35 upon which they are mounted. These pawls 37 are known as the set pawls as the same control the set or feed of the head blocks. The pawls 37 gradually increase in length a slight fraction of an inch so as to insure the engagement of at least one of these pawls with a tooth of the ratchet wheel during operation of the yoke. The outermost pawl 37 is provided with a lug 38 below the pivot point thereof and a pin 39 carried by the sliding plate 40 is adapted to engage between the lug 38 and the pawl, so that upon movement of the plate downward the pawl will be moved away from the tooth of the ratchet wheel. The pawls of the set of pawls are connected one with the other for synchronous movement by the use of suitable pins 41.

The shaft 35 also has pivotally mounted thereon a pawl 42 for engaging the ratchet wheel 26. This pawl 42 is likewise provided with a lug 43 similar to the lug 38 and this lug is engaged by a pin 44 carried by the sliding plate 45. This plate 45 is similar to the plate 40 and is mounted on the opposite side of the yoke 24 from said plate 40. In order to hold the plates 40 and 45 in adjusted positions against accidental displacement guide straps 46 are carried by the arms of the yoke therefor and these straps carry suitable detents for fitting in the sockets 47 formed in the plates.

The lower end of the plate 40 has formed thereon a foot 48 which is adapted to engage an arm 49 of a lever 50. This lever 50 is rockably mounted at a point intermediate its ends on a suitable stud 51 carried by the frame 20. The inner end of the lever 50 has formed thereon a laterally projecting leg 52 which is disposed under the arms 53 of a set of locking pawls 54. These pawls 54 are provided for engaging the teeth of the ratchet wheel 27 to normally hold the same against movement. The pawls are of slightly different lengths, so as to insure the proper engagement thereof with the ratchet wheel under all conditions. As clearly shown the pawls 54 are rockably mounted upon a pin 55 secured to a segment 56 over which the yoke 24 travels. The plates 40 and 45 are connected by means of rods 57 and 58 to the opposite terminals of a double arm lever 59 which is keyed or otherwise secured to the operating handle 60. To accomplish an adjustable and detachable connection between the rods 57 and 58 and the plates 40 and 45, the latter are provided with sockets 57$^b$ and 58$^b$ for receiving the ends of the rods which are secured in place by the set screws 57$^c$ and 58$^c$. This operating handle 60 forms one of the salient features of the invention and is rotatably, but non-slidably carried by a sleeve 61, which is formed on or connected with a yoke 62. This yoke 62 straddles the lever 25 and is in turn secured to the upper end thereof by means of a pivot pin 63. This operating handle 60 extends over the saw carriage toward the operator of the saw and is provided with a suitable hand grip 64. If desired a set screw 65 can be carried by the yoke 62 for engagement with the lever to limit the downwardly swinging movement thereof.

In operation of the improved device, when it is desired to feed the blocks toward the saw in a step by step movement the handle 60 is turned in a counter clockwise direction (referring to Figure 8) so as to throw the pawl 42 out of engagement with the ratchet wheel 26. The handle 60 is now pulled toward the operator which will turn the ratchet wheel 27 and consequently rotate the shaft 15 and thus move the knees or head blocks toward the saw.

After the work has been advanced and it is desired to quickly return the head blocks to their normal positions the handle 60 is turned in a clockwise direction which will push down on the rod 57 and raise the rod 58. This will lift the pawls 37 owing to the connection thereof with the plate 40 and at the same time the plate 40 will operate the lever 50 and swing the locking pawls 54 from out of engagement with the ratchet wheel 27. The raising movement of the rod 58 will allow the pawl 42 to engage the ratchet wheel 26 and upon a pull being exerted on the handle 60 by the operator toward the saw the ratchet wheel 26 will be rotated. This will cause the rapid rotation of the shaft 15 in a reverse direction from that given it by the ratchet wheel 27 and consequently the head blocks will be moved away from the saw.

In order to limit the swing of the lever 25, so that the knees or head blocks can be advanced the desired distance at each movement of the lever, a pin 66 is provided which can be placed in any one of the openings 68 in the segment 56. These openings are equidistantly spaced a predetermined distance and the lever 25 is defined between the pin 66 and a set screw 67 which can be initially adjusted. It is obvious that by placing the pin 66 in the desired opening that the desired distance of swing of the lever can be had.

It is obvious from the foregoing that the use to which the improved device can be put is not limited to a saw mill but that the same can be used wherever it is necessary or desirable to accurately advance a device in a step by step movement and then quickly recede the device to its original position.

Changes in details may be made without departing from the spirit or scope of this invention, but:

What I claim as new is:

1. A control attachment for the purpose specified comprising an operating shaft, an operating lever, advancing and receding ratchet wheels for the shaft, advancing and receding pawls pivotally carried by the lever for engaging the ratchet wheels, a manipulating handle rotatably carried by the lever and projecting forwardly therefrom, pawl operating rods slidably carried by the lever, means operatively connecting the rods to the pawls for moving the pawls out of engagement with the ratchet wheels when moved in one direction, a two arm lever carried by the handle having the pawl operating rods connected therewith, whereby upon turning movement of the handle one of the rods will be raised and the other lowered for moving one set of pawls in operation and the other out of operation.

2. A control attachment comprising an operating shaft, an operating lever, an advancing ratchet wheel and a receding ratchet wheel for the shaft, pivoted pawl engaging means carried by the lever for engaging the advancing ratchet wheel, pivoted pawl engaging means carried by the lever for the receding ratchet wheel, each of said pawl engaging means having laterally projecting ears formed thereon at one side of the pivot points thereof, sliding plates carried by the opposite sides of the lever having inwardly directed pins for engaging said ears whereby upon movement of said plates the pawl engaging means will be moved into or out of engagement with said ratchet wheels, and an operating handle for the operating lever operatively connected to the plates for moving the same alternately in opposite directions.

3. A control attachment comprising an operating shaft, a lever, an advancing ratchet wheel and a receding ratchet wheel for the shaft, pivoted pawl engaging means carried by the lever for engaging the advancing ratchet wheel, pivoted pawl engaging means carried by the lever for the receding ratchet wheel, each of said pawl engaging means having laterally projecting ears formed thereon at one side of the pivot points thereof, sliding plates carried by the opposite sides of the lever having inwardly directed pins for engaging said ears whereby upon movement of said plates the pawl engaging means will be moved into or out of engagement with said ratchet wheels, an operating handle for rocking the lever and operatively connected to the plates to move the latter in opposite directions, and latch means for preventing accidental movement of the plates.

4. A combined fractional set works and receding mechanism for saw mills comprising an operating shaft, an advancing ratchet wheel having accurately spaced teeth keyed to said shaft, a receding ratchet wheel rotatably mounted on the shaft, speed gearing operatively connecting the receding ratchet wheel with the shaft, an operating lever rockably mounted on the shaft, and advancing set of pawls and a receding set of pawls rockably carried by the lever for engaging the advancing ratchet wheel and the receding ratchet wheel respectively, a forwardly extending single manipulating handle for the lever rotatably connected therewith, and means for operatively connecting the handle with the pawls, whereby upon movement of the handle in one direction one set of pawls will be moved into engagement with its ratchet wheel and the other set of pawls out of engagement with its ratchet wheel.

5. A control device comprising an operating shaft, an advancing ratchet wheel having accurately spaced teeth in the shaft, a receding ratchet wheel rotatably mounted on the shaft, speed gearing operatively connecting the receding ratchet wheel to the shaft, an operating lever rockably mounted on the shaft, an advancing pivot pawl rockably mounted on the lever and engaging the advancing ratchet wheel, a receding pawl rockably carried by the lever for engaging the receding ratchet wheel, the pawls of the set of advancing pawls being of slightly different lengths as to insure the proper engagement therewith with the teeth of the advancing ratchet wheel, pins operatively connecting the pawls together, a forwardly extending single manipulating handle for the lever rotatably connected therewith, and means for operatively connecting the handle with one of the pawls of the set of advancing pawls and with the receding pawl, whereby upon movement of the handle in one direction the set of advancing pawls will be moved into engagement with the ratchet wheel and the other pawl out of engagement with the ratchet wheel and vice versa upon movement of the handle in the opposite direction.

6. A control device comprising an operating shaft, an advancing ratchet wheel having accurately spaced teeth keyed to said shaft, a receding ratchet wheel rotatably mounted on the shaft, speed gearing operatively connecting the receding ratchet wheel with the shaft, an operating lever rockably mounted on the shaft, an advancing set of pawls and a receding set of pawls rockably carried by the lever for engaging the advancing ratchet wheel and the receding ratchet wheel respectively, a forwardly extending manipulating handle for the lever rotatably connected therewith, means for operatively connecting the handle with the pawls, whereby upon movement of the handle in one direction one set of pawls will be moved into engagement with its ratchet wheel and the other set of pawls out of engagement with its ratchet wheel, and vice versa upon movement of the handle in the opposite direction, a set of locking pawls for the advancing ratchet wheel, and means for automatically releasing the locking pawls from out of engagement with the advancing ratchet wheel by the handle when the set of advancing pawls are moved from out of engagement with the advancing ratchet.

7. A control device comprising an operating shaft, an advancing ratchet wheel having accurately spaced teeth keyed to the shaft, a receding ratchet wheel rotatably mounted on the shaft, speed gearing operatively connecting the receding ratchet wheel with the shaft, an operating lever rockably mounted on the shaft, an advancing set of pawls and a receding pawl rockably carried by the lever for engaging the advancing ratchet wheel and the receding ratchet wheel respectively, a set of locking pawls for the advancing ratchet wheel, pawls of the set of advancing pawls and the set of locking pawls being slightly different lengths to insure the proper engagement thereof with the advancing ratchet wheel, means operatively connecting the set of advancing pawls together, an ear formed on one of the pawls arranged below the pivot point thereof, a similar ear formed on the receding pawl, a pair of sliding plates carried by the opposite sides of the lever having inwardly directed pins for engaging the ears, a pivoted lever rockably secured at one side of the locking pawls, a foot formed on one of the plates engaging the lever to cause the rocking thereof when the plate is moved in one direction, the lever having an arm for engaging the locking pawls to move the same from out of engagement with the advancing ratchet wheel, a forwardly extending manipulating handle for the lever rotatably connected therewith, and rods operatively connecting the opposite sides of the lever and said plates, whereby upon movement of the handle in one direction the set of advancing pawls and the locking pawls will be moved out of engagement with a ratchet wheel and the receding pawl in engagement with its ratchet wheel and vice versa upon movement of the handle in the opposite direction.

8. A fractional set works comprising a shaft, an advancing ratchet wheel connected thereto, a reversing gear train operatively associated with said shaft, a pawl for the gear train, a pawl for the advancing ratchet wheel, a detent for the advancing ratchet wheel, a single lever carrying said pawls and means carried by said lever having operative connections with the pawls and detent whereby the pawl and detent of the advancing ratchet wheel will be jointly moved to operative and inoperative positions as the gear train pawl is moved to an operative or inoperative position.

9. In combination with a saw mill shaft, a frame in which said shaft is journaled, a pair of ratchet wheels, one fixed to said shaft, the other loose thereon, an internal gear a component part of said loose ratchet wheel, a gear train between said internal gear and said shaft, an operating pawl for said fixed ratchet wheel, an operating pawl for said loose ratchet wheel, a group of detents having off-set points of engagement with said fixed ratchet wheel, a single lever carrying both of said pawls, and mechanism supported by said lever and said frame and having operative connections with both of said pawls and said detents, whereby the pawl and detents of the fixed ratchet wheel will be jointly moved to operative and inoperative positions as the loose ratchet wheel pawl is moved to operative and inoperative positions.

10. In combination, shaft operating mechanism including an oscillating lever, a plurality of sets of pawls supported by the lever, operating mechanism for selectively adjusting said pawls consisting of plates slidably mounted on the lever and operatively associated with said pawls, a yoke adjustably connected to the lever, a double-armed lever operatively connected to the plates, and a handle rockably mounted in the yoke and detachably connected to said double-armed lever.

11. A pawl construction for set works comprising a fixed rod, a group of pawls mounted on the rod and having an interfitting connection with each other, a plate having a slot slidably receiving said rod and further having a pin engaging one of the pawls, a device for frictionally controlling the movement of the plate, and operating means for the plate including a rod removably and adjustably connected to the plate.

In testimony whereof I affix my signature.

CHARLES H. TURNER.